United States Patent
Brackett et al.

(10) Patent No.: US 7,174,806 B2
(45) Date of Patent: *Feb. 13, 2007

(54) FLEXIBLE BEARING DAMPING SYSTEM, ENERGY STORAGE SYSTEM USING SUCH A SYSTEM, AND A METHOD RELATED THERETO

(75) Inventors: Norman C. Brackett, No. Reading, MA (US); Omar M. Kabir, Delanson, NY (US); James F. Arseneaux, Westford, MA (US)

(73) Assignee: Beacon Power Corporation, Wilmington, MA (US)

( * ) Notice: Subject to any disclaimer, the term of this patent is extended or adjusted under 35 U.S.C. 154(b) by 38 days.

This patent is subject to a terminal disclaimer.

(21) Appl. No.: 09/952,231

(22) Filed: Sep. 13, 2001

(65) Prior Publication Data

US 2003/0048964 A1  Mar. 13, 2003

(51) Int. Cl.
*H02K 7/02* (2006.01)
*F16C 15/00* (2006.01)
*F16F 15/12* (2006.01)

(52) U.S. Cl. ............ 74/572.1; 74/572.11; 74/572.12; 74/572.2; 74/573.13; 74/574.4; 165/86; 165/185; 384/476; 384/536; 310/74; 310/180

(58) Field of Classification Search .......... 74/572–574, 74/574.4; 165/46, 185, 86; 384/476, 536; 310/58, 180, 54, 74, 64, 59

See application file for complete search history.

(56) References Cited

U.S. PATENT DOCUMENTS

| | | | | |
|---|---|---|---|---|
| 4,020,372 A | * | 4/1977 | Whiteley | 310/61 |
| 4,114,246 A | * | 9/1978 | Kamman | 29/451 |
| 4,437,030 A | * | 3/1984 | Coquillart | 310/227 |
| 4,869,068 A | * | 9/1989 | Van Vloten | 62/51.1 |
| 5,317,879 A | * | 6/1994 | Goldberg et al. | 62/51.1 |
| 5,344,239 A | | 9/1994 | Stallone et al. | 384/99 |
| 5,390,734 A | * | 2/1995 | Voorhes et al. | 165/185 |
| 5,461,498 A | | 10/1995 | Iwao | 359/200 |
| 5,553,834 A | | 9/1996 | Je et al. | 267/140.12 |
| 5,614,777 A | * | 3/1997 | Bitterly et al. | 310/74 |
| 5,980,386 A | | 11/1999 | Friedmann et al. | 464/24 |

(Continued)

FOREIGN PATENT DOCUMENTS

DE   26 24 959 A1 * 12/1977

(Continued)

OTHER PUBLICATIONS

Written Opinion dated Apr. 28, 2004.

(Continued)

*Primary Examiner*—Vinh T. Luong
(74) *Attorney, Agent, or Firm*—David G. Conlin; John J. Penny, Jr.; Edwards Angell Palmer & Dodge LLP (57) ABSTRACT

A bearing damping system for damping vibrations and conducting heat from vibration-producing, heat-generating devices, an evacuated energy storage system including such a bearing damping system for damping vibrations produced by the rotating shaft and conducting heat from bearings and/or bearing assemblies; and a method for damping vibrations and conducting heat from vibration-producing, heat-generating devices. The bearing damping system includes one or more flexible bearing dampers in combination with one or more heat transferring rosettes. The heat transferring rosettes comprise a flexible thermally conductive member that transfers heat by conduction from the bearings, bearing assemblies and/or heat generating devices to a remote heat sink.

22 Claims, 5 Drawing Sheets

U.S. PATENT DOCUMENTS

| | | | |
|---|---|---|---|
| 6,069,424 A | 5/2000 | Colello et al. | 310/58 |
| 6,175,172 B1* | 1/2001 | Bakholdin et al. | 310/74 |
| 6,236,127 B1* | 5/2001 | Bornemann | 310/74 |
| 6,262,505 B1* | 7/2001 | Hockney et al. | 310/90.5 |
| 6,624,542 B1* | 9/2003 | Gabrys et al. | 310/54 |
| 6,633,106 B1* | 10/2003 | Swett | 310/268 |
| 6,747,378 B2* | 6/2004 | Brackett | 310/51 |
| 6,959,756 B2* | 11/2005 | Woodard et al. | 165/86 |
| 2002/0063368 A1 | 5/2002 | Kabir | 267/147 |
| 2003/0029600 A1* | 2/2003 | Woodard et al. | 165/46 |
| 2003/0052558 A1* | 3/2003 | Brackett et al. | 310/90.5 |
| 2004/0244963 A1* | 12/2004 | Hazelton | 165/272 |
| 2005/0040776 A1* | 2/2005 | Sibley | 318/150 |

FOREIGN PATENT DOCUMENTS

| | | | |
|---|---|---|---|
| DE | 199 49 755 A 1 | 4/2001 | |
| JP | 61224838 | 10/1986 | |
| WO | WO 02/37201 A1 * | 5/2002 | 74/572 |

OTHER PUBLICATIONS

International Preliminary Examination Report dated Sep. 27, 2004.
Supplemental European Search Report dated Nov. 11, 2005.
Supplementary Partial European Search Report dated Aug. 26, 2005.

* cited by examiner

FLEXIBLE BEARING DAMPING SYSTEM, ENERGY STORAGE SYSTEM USING SUCH A SYSTEM, AND A METHOD RELATED THERETO

FIELD OF THE INVENTION

The present invention relates to a damping system for an energy storage system, an energy storage system using such a system, and a method related thereto. More precisely, the invention relates to a flexible bearing damper in combination with one or more heat-transferring devices, which combination produces flexible bearing support to reduce rigid body critical speed of the flywheel assembly of the energy storage system and which, further, conducts heat away from the bearing.

DESCRIPTION OF THE RELATED ART

Flywheel-based, evacuated energy storage devices ("flywheel assemblies") are useful devices for readily storing and recovering energy. Typically, flywheel assemblies comprise a high-powered, high-strength motor that drives a rotating, or rotary, shaft, which, in turn, drives a flywheel rotor. The rotary shaft turns the flywheel rotor at a relatively high rate of speed, or frequency (revolutions per second), storing kinetic energy. To minimize energy loss through air friction, i.e., "drag", flywheel assemblies often, if not exclusively, are contained in an evacuated chamber. At least one drag pump creates a vacuum and removes gases and other particulate matter from the flywheel housing, generally pumping the gases into a separate gas storage chamber.

When used, for example, as an auxiliary or emergency power source, if the motor ever shuts down, e.g., due to a power outage, the stored kinetic energy in the flywheel assembly enables the rotor to continue to rotate. This rotation produces, or generates, current by induction, which is to say electrical power. Accordingly, this induced current can be used to provide short-term, auxiliary or emergency power. Preferably, this limited period of time is less than the time needed to power up and bring online an auxiliary generator, e.g., a diesel generator.

Further, state-of-the-art energy-storing rotors, typically, include an outer rim commonly made of high-strength, low-density composite fibers, which maximize energy storage density. Indeed, the amount of energy stored in a flywheel assembly is directly proportional to its mass and to the square of the rotational velocity of the flywheel rotor. Consequently, flywheel assemblies are being developed that rotate at ever-increasing velocities.

Figure 1:
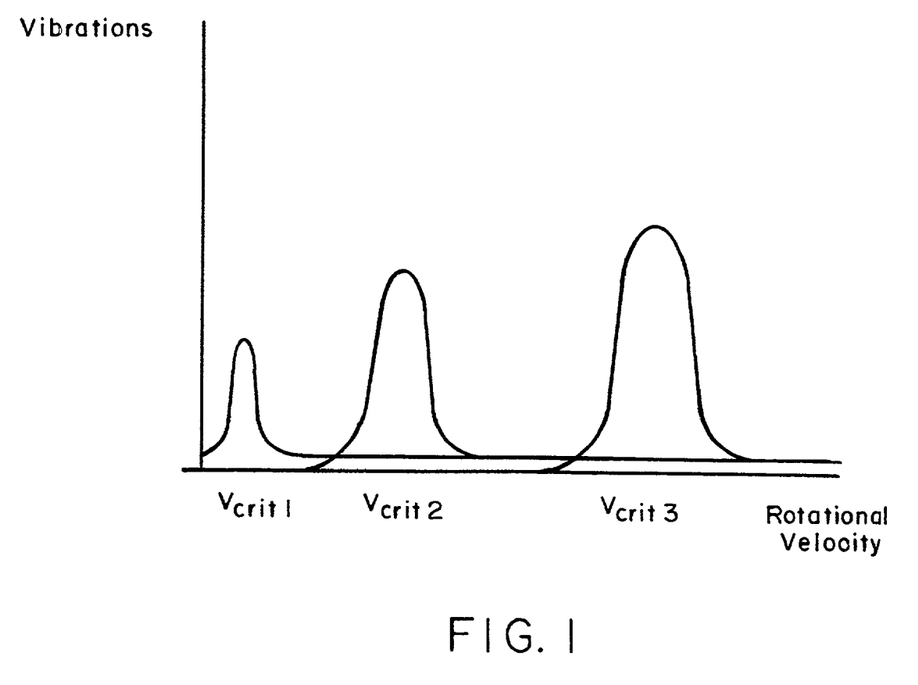
FIG. 1 illustrates the relationship between rotational velocity and vibration amplitude.

State-of-the-art flywheel assemblies operating at increasingly higher velocities; however, require transitioning, or passing, the flywheel assembly through its critical velocity ($V_{crit}$) during power up. FIG. 1 shows graphically the relationship between rotational velocity and vibration amplitude. As the figure shows, the amplitude of vibrations is greatest at and near critical velocity, i.e., the point of resonance. The figure also shows that the amplitude of vibrations increases with increasing critical velocity for a fixed amount of imbalance and damping.

Therefore, it is intuitive that flywheel assemblies designed with a relatively low rigid body critical speed are preferred to flywheel systems designed with a relatively high rigid body critical speed. Indeed, vibrations produce displacement, e.g., of the stator assembly with respect to the rotor assembly. At very high amplitudes, such relative displacement could result in physical contact between the assemblies. Such contact is detrimental—if not destructive—to the flywheel assembly. Indeed, the consequences of excessive displacement can cause one or more of the following to occur:

(i) breakage;

(ii) local overheating, which can destroy the material properties of the rotor, stator and/or other component parts of the flywheel assembly;

(iii) damage to the rotor causing a misbalance, which makes the rotor dynamically unstable; and/or (iv) damage to the rotor increasing the tolerance between the rotor and stator assemblies, which additional clearance space could exceed the capability of the drag pump to effectively evacuate the energy storage system. Accordingly, it has become increasingly more important in the design of flywheel assemblies to design a system that has a relatively low critical velocity.

The rotary shaft, generally, is rotatably supported by one or more bearings and/or bearing assemblies. The bearings and/or bearing assemblies (i) support and guide the rotary shaft; (ii) permit free motion between the moving rotary shaft and fixed parts; (iii) minimize energy loss and wear and tear due to friction; and (iv) dampen internal vibrations produced by the rotary shaft and/or flywheel assembly. Notwithstanding the significance of the other, interrelated functions, supporting the rotary shaft and damping vibrations during operation probably remain the primary role of a bearing and/or bearing assembly. Indeed, it is imperative that bearings and/or bearing assemblies provide flexible support and, moreover, good radial damping.

To this end, bearings and/or bearing assemblies are mounted in or provided with dampers for the purpose of, inter alia, (i) damping vibrations; (ii) transferring heat away from the bearings; and (iii) reducing the load on the bearings. Thus, bearing dampers extend the life of the bearing, facilitate magnetic levitation, and provide good radial damping.

Preferably, bearing dampers are flexible. Flexibility substantially minimizes the rigid body critical speed of the rotary shaft to a low frequency, which can be crossed safely with corresponding low energy, e.g., while the flywheel assembly powers up to its normal, design operating speed.

More preferably, bearing dampers are flexible with correspondingly low axial, radial, and transverse stiffness. For example, it is undesirable for a damper to affect the lift system of a rotor that is supported by magnetic bearings. Accordingly, axial stiffness must remain as low as possible. In another example, low radial stiffness reduces the dynamic force acting on the bearing and/or bearing assembly, which can extend its service life. Accordingly, radial stiffness should be kept as low as possible. In yet another example, stiffer dampers produce stiffer flywheel assemblies, which are more susceptible to problems associated with imbalances, not to mention having a higher critical velocity.

Indeed, an ideal bearing damper produces (i) relatively low damping when a flywheel assembly operates at high speeds; (ii) relatively high damping when a flywheel assembly operates at low speeds; and (iii) maximum damping when a flywheel assembly operates at or near the critical velocity. The more flexible, i.e., less stiff, the damper, the lower the critical velocity. Accordingly, the amplitude of vibrations of the flywheel assembly at or near its critical velocity is minimized. The opposite is also true. Indeed, in relative terms, the greater the damper stiffness, i.e., the less flexible, the higher the critical velocity. As a result, increased damping of the flywheel assembly is required at or near its critical velocity.

U.S patent application Ser. No. 09/728,822 filed on Nov. 29, 2000 to Kabir for a "Mesh Bearing Damper for an Energy Storage Rotor", the teachings of which are incorporated herein by reference, discloses a mesh bearing damper having suitable flexibility characteristics for the purpose of damping vibrations at low critical speeds and good heat transfer away from the bearings. A second, alternate bearing damper includes an elastomeric, e.g., silicon rubber, damper, which provides excellent flexibility characteristics and is cheaper to manufacture than the mesh bearing damper.

However, elastomers are superb insulators, which is to say inadequate heat conductors. Furthermore, mesh bearing dampers are inadequate conductors. Accordingly, elastomeric and/or mesh bearing dampers, by themselves, cannot perform one of the primary roles described above for effective dampers, i.e., conduct heat away from the bearings. In a vacuum environment, in which conduction is the only available means of heat dissipation, this produces a dilemma. Indeed, the stiffness properties of elastomers and mesh are desirable in bearing dampers for damping vibrations, but the heat transfer properties are not.

SUMMARY OF THE INVENTION

Thus, it would be desirable to produce a flexible bearing damping system that damps vibrations, i.e., reduces the amplitude of the vibrations. Furthermore, it would be desirable to produce a flexible bearing damper system that prevents deleterious contact between moving and stationary parts of the flywheel assembly and, moreover, minimizes the rigid body critical speed of the flywheel rotor. Moreover, it would be desirable to produce a flexible bearing damping system that conducts heat generated by the bearings or bearing assemblies to a remote heat sink.

Therefore, the present invention produces a flexible bearing damping system that produces sufficient radial damping to protect the bearings and/or bearing assemblies by substantially lowering the amplitude of vibrations.

Additionally, the present invention produces a flexible bearing damping system that minimizes the rigid body critical speed of the flywheel rotor.

Furthermore, the present invention produces a flexible bearing damping system that substantially lowers the load on the bearings and/or bearing assemblies to enhance bearing life.

In addition, the present invention produces a flexible bearing damping system that produces minimal radial stiffness to enhance bearing and/or bearing assembly life.

Further, the present invention produces a flexible bearing damping system that produces minimal axial and transverse stiffness to minimize operating moments and to facilitate magnetic levitation.

Moreover the present invention produces a bearing damping system that enhances bearing and operational life by conducting heat away from the bearings and/or bearing assemblies to a remote heat sink.

A flexible bearing damping system in accordance with one aspect of the present invention comprises one or more flexible bearing dampers in combination with one or more heat transferring devices, e.g., rosettes, such as those described in U.S. patent application Ser. No. 09/924,153 filed on Aug. 7, 2001 entitled "Device for Cooling a Bearing, Flywheel Storage System Using such a Bearing Cooling Device, and Methods Related Thereto", the teachings of which are incorporated herein by reference.

The heat transferring device is advantageously configured and arranged so that at least some of the heat energy produced by the bearings, bearing assemblies, and/or other heat generating devices is communicated from the locus of the bearings, bearing assemblies, and/or heat generating devices to a remote heat sink. Broadly, in one aspect of the present invention, a first end of the heat transferring device is thermally coupled directly with the bearings, bearing assemblies, and/or heat generating devices and a second end is thermally coupled directly or indirectly with the remote heat sink. In one embodiment, heat-transferring device comprises a flexible thermal member having first and second ends that are disposed thermally coupled to the heat transferring device and heat sink, respectively.

Ideally, the flexible thermal member, e.g., a multi-strand cable made of copper, aluminum, silver, carbon, including carbon fiber and carbon-carbon composites, and the like, is configured and arranged to allow relative displacement and/or motion between the bearings, bearing assemblies, and/or heat generating devices and the remote heat sink in at least one and preferably three directions or dimensions. Preferably, the flexible thermal member extends in a generally radial or, alternately, axial direction between the first and second ends thereof.

The one or more flexible bearing dampers is/are advantageously configured and arranged so that at least some of the vibrations produced by the bearings, bearing assemblies, and/or other heat generating devices are damped to prevent physical contact between the rotor and stator assemblies of the flywheel assembly. Furthermore, the one or more flexible bearing damper is/are advantageously configured and arranged so that the rigid body critical speed of the flywheel rotor is minimized so that relatively low energy and relatively low damping are required as the flywheel assembly powers up and crosses its critical velocity.

Broadly, in one aspect of the present invention, the flexible bearing damper comprises an elastomeric bearing damper that is molded into and fixedly attached to a more rigid outer mounting ring and a more rigid inner support ring. The inner support ring is securely and removably attached so as to communicate directly or indirectly, e.g., through bearing cap, with the bearing, bearing assembly, and/or heat generating device and the outer mounting ring is securely and removably attached so as to communicate directly or indirectly with an outer mounting ring and/or a heat sink.

Accordingly, in another aspect of the present invention, each bearing, bearing assembly, and/or heat generating device is in direct communication with the inner support ring of one or more flexible bearing dampers. Furthermore, each bearing, bearing assembly, and/or heat generating device is in direct or indirect communication with one or more, preferably at least two, heat transferring devices, which are disposed above and below the flexible bearing damper. Preferably, the flexible thermal members of the heat transferring device extend radially to a remote heat sink. Alternately, the flexible thermal members extend axially to a remote heat sink.

In one aspect of the present invention, the bearing damper has a radial stiffness between about 500 pounds per in (lb/in) and about 4000 lb/in. More preferably, the bearing damper has a radial stiffness of about 1200 lb/in. Moreover, the heat transferring device has minimal radial stiffness so that all or substantially all of the damping from the system is provided by the flexible bearing damper and little to no damping is provided by the heat transferring device.

The present invention also discloses an evacuated energy storage system comprising (i) a rotor assembly that rotates a flywheel; (ii) a high-energy motor that rotates the rotor assembly; (iii) one or more bearings and/or bearing assemblies that support the rotor assembly; and (iv) one or more flexible bearing damping systems that further comprises one or more flexible bearing dampers, of a type described above, and one or more heat transferring devices, of a type described above.

The present invention further discloses a method of damping vibrations produced by a rotating device, e.g., a flywheel rotor, the method comprising the steps of (i) radially damping a bearing, bearing assembly, and/or other heat generating device to minimize the rigid body critical speed of the flywheel assembly; and (ii) thermally coupling the heat generating device to a remote heat sink to conduct heat energy from the heat generating device to the remote heat sink. Preferably, thermal coupling the heat-generating device to the remote heat sink includes thermally coupling a first end of a flexible thermally conductive member to the bearing, bearing assembly and/or other heat-generating device and, further, thermally coupling a second end of the flexible thermally conductive member to the remote heat sink.

Indeed, in one aspect of the present invention, the first end of the flexible thermally conductive member is thermally coupled directly or indirectly to the bearing, bearing assembly, and/or other heat generating device using an inner ring that is in communication directly or indirectly with the bearing, bearing assembly and/or other heat generating device and the second end of the flexible thermally conductive member is thermally coupled directly or indirectly to the remote heat sink using an outer ring that is in communication directly or indirectly with the remote heat sink. Thus, the flexible thermal member is configured and arranged so that at least some of the heat energy generated by the bearings, bearing assemblies, and/or heat generative device is thermally communicated to the remote heat sink.

BRIEF DESCRIPTION OF THE DRAWINGS

For a fuller understanding of the nature and desired objects of the present invention, reference is made to the following detailed description taken in conjunction with the accompanying figures wherein like reference character numbers denote corresponding parts throughout the several views and wherein.

DETAILED DESCRIPTION OF THE INVENTION AND ITS PREFERRED EMBODIMENTS

Figure 2:
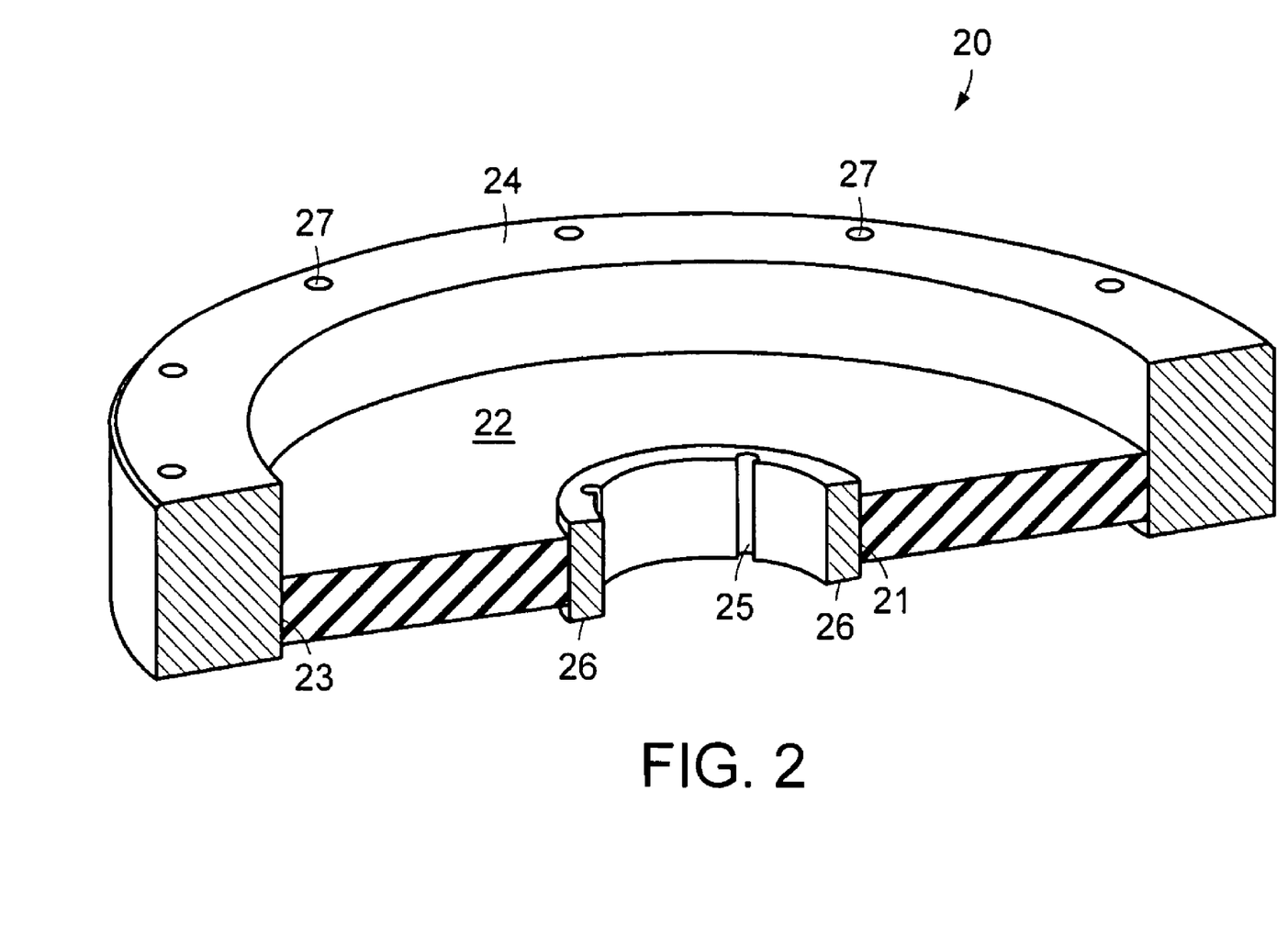
FIG. 2 is an isometric cross-section of an illustrative embodiment of an elastomeric-type bearing damper according to one aspect of the present invention.
Figure 4:
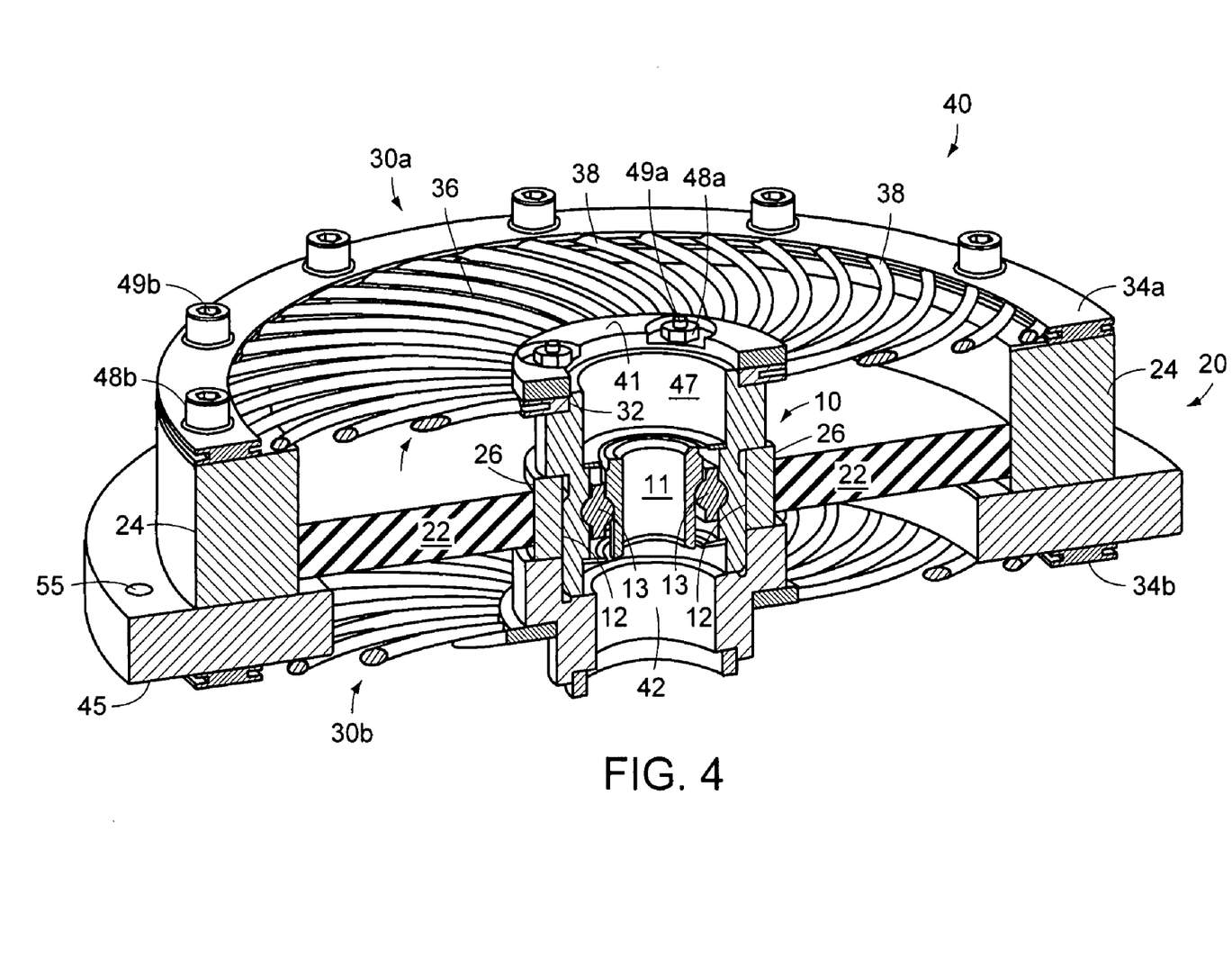
FIG. 4 is cross-sectional view of an illustrative embodiment of a bearing damping system according to one aspect of the present invention.

Preferably, a bearing damping system 40 according to the present invention comprises one or more flexible bearing dampers 20 in combination with one or more heat transferring devices 30. One aspect of the bearing damper 20 will now be described. Referring now to FIGS. 2 and 4, there are shown illustrative embodiments of a flexible bearing damper 20 and of the damper 20 combined within the embodied system 40, respectively. It should be noted at the outset that the embodiments depicted in FIGS. 2 and 4 are illustrative for the purpose of describing the invention only and are not to be taken or construed as limiting.

Preferably, the bearing damper 20 includes a core element 22 that is fixedly secured or tightly confined between a circumferential outer mounting ring 24 and a circumferential inner support ring 26. Preferably, the core element 22 is a metal mesh-type and/or fabricated from elastomers, e.g., silicon rubber, and the like, by at least one of molding, extruding, and the like. Furthermore, it is preferred that the core element 22 provides a radial stiffness for damping purposes of about 500 lb/in to about 4000 lb/in, and more preferably, a radial stiffness of about 1200 lb/in. Stiffness within this range produces flexible support to the bearing, bearing assembly, and/or heat generating device 10; minimizes the rigid body critical speed of the flywheel assembly (not shown); and, moreover, produces sufficient radial damping to dampen internal vibrations produced by the rotary shaft 51 (see FIG. 5), especially at or near its critical velocity.

In one aspect of the present invention, the inner support and outer mounting rings 26 and 24 are fabricated, e.g., cast, machined from bar stock, molded, and the like out of a good conducting material e.g., aluminum, metals, alloys, carbon, including carbon fiber and carbon-carbon composites, and the like.

According to one aspect of the present invention, the core element 22 is molded into and between the inner support ring 26 and the outer mounting ring 24 in a manner that is well known to the art. Alternate methods of mounting the core element 22 between the inner support ring 26 and outer mounting ring 24 include fixedly attaching the core element 22 to the rings 24 and 26 and/or providing a tight interference fit between the core element 22 and the rings 24 and 26. For example, the core element 22 can be fixedly attached to the inner support ring 26 and/or outer mounting ring 24, e.g., using adhesives; by a process comprising the steps of, first, cryogenetically shrinking or constricting the elastomeric damper 20, then installing it against and between the inner support and outer mounting rings 26 and 24, and, finally, allowing it to expand as it warms up to produce a tight interference fit with the inner support ring 26 and the outer mounting ring 24; by confining its inner and outer peripheries 21 and 23 in grooves (not shown) provided therefor, respectively, in the inner support and outer mounting rings 26 and 24, and the like.

The inner support ring 26 is configured and arranged so that it produces a tight interference fit with the bearing, bearing assembly, and/or heat generating device 10, and, more particularly, so that its inner periphery produces a tight interference fit with the outer race 12 of the bearing, bearing assembly, and/or heat generating device 10. Accordingly, those skilled in the art can vary the diameter of the inner support ring 26 to optimize available bearings, bearing assemblies, and/or heat generating devices 10 and weight and spatial requirements. Likewise, the outer mounting ring 24 is configured and arranged to satisfy weight, balance, and spatial requirements.

In one aspect of the present invention, the inner support ring 26 includes a plurality of slots 25, which are configured and arranged to accept a similar plurality of inner securing bolts 49a that are used in a manner and for a purpose to be described below. Likewise, preferably, the outer mounting ring 24 includes a plurality of holes 27 to accept a similar plurality of outer securing bolts 49b that also are used in a manner and for a purpose to be described below.

A typical bearing and or bearing assembly will now be described. Preferably, the inner race 11 of the bearing and/or bearing assembly 10 is in tight interference fit with the rotary shaft 51, i.e., the rotor (see FIG. 5). Thus, the rotor and the inner race 11 of the bearing and/or bearing assembly 10 rotate substantially as a unit. A rolling element, e.g., the ball bearings, 13 travels along the outer face of the inner race 11 as well as the inner face of the outer race 12, and is confined therebetween. The outer race 12 does not rotate. Accordingly, if the shaft displaces in a radial direction, e.g., due to internal vibrations produced by the rotation of the rotor, the rolling element 13 transfers the radial force to the inner face of the outer race 12, causing displacement of the outer race 12 of approximate equal magnitude. The opposite is also true, which is to say that if the stator assembly (not shown) displaces in a radial direction, the rolling element 13 transfers displacement of approximate equal magnitude to the outer face of the inner race 11.

Preferably, the bearing and/or bearing assembly 10 is/are configured and arranged such that it can be securely and removably attached to a lower bearing cap 42. The lower bearing cap 42 facilitates adapting commercially available, off-the-shelf bearings and/or bearing assemblies 10 to the particular use described herein.

In a separate embodiment, the bearing and/or bearing assembly 10 is/are configured and arranged such that it is confined between an upper bearing cap 47 and a lower bearing cap 42. The upper and lower bearing caps 47 and 42, similarly, facilitate adapting commercially-available, off-the-shelf bearing assemblies 10 to the particular use described herein.

The bearing, bearing assembly and/or heat generating device 10 generates heat from, inter alia, the movement of the rolling element 13. Such heat must be transferred or conducted away from the bearings, bearing assemblies, and/or heat generating devices 10 to a remote heat sink to extend the operation life of the bearings, bearing assemblies, and/or heat generating devices 10. Therefore, it is important that the outer race 12 of the bearing, bearing assembly and/or heat-generating device 10 as well as any upper and lower bearing caps 47 and 42 be made of a good conducting material to enable and enhance further heat transfer by the heat transferring device 30.

Here again, the flexible damper 20 is configured and arranged to provide a radial stiffness that minimizes the rigid body critical speed and allows some radial relative displacement between the spinning rotor and the fixed stator assemblies.

Figure 3:
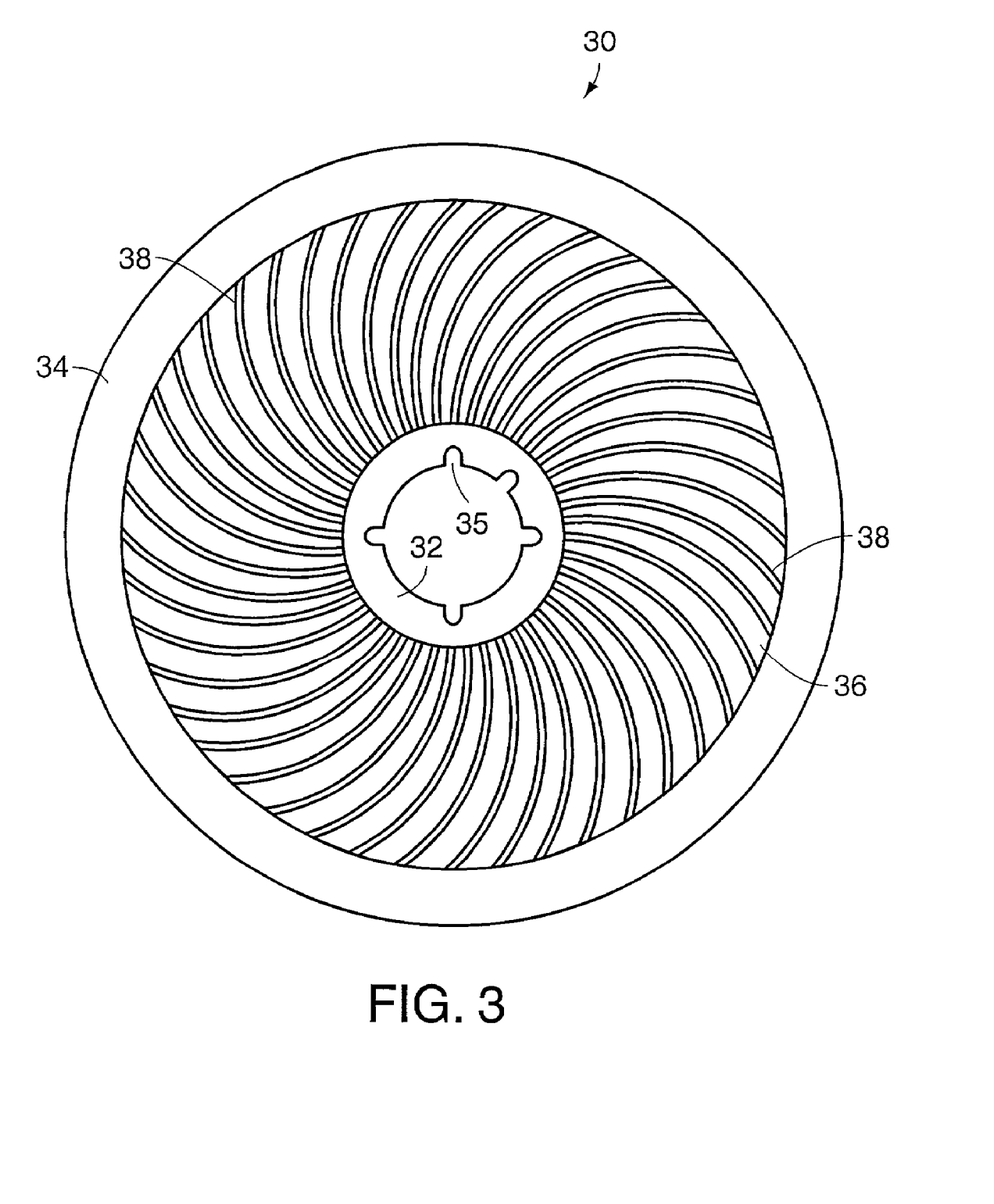
FIG. 3 is a plan view of an illustrative embodiment of a heat transferring device according to one aspect of the present invention.

One aspect of a heat transferring device 30 will now be described. Referring now to FIGS. 3 and 4, there are shown illustrative embodiments of a heat transferring device 30 and the same device 30 combined within the embodied system 40, respectively. It should be noted at the outset that the embodiments depicted in FIGS. 3 and 4 are illustrative for the purpose of describing the invention only and are not to be taken or construed as limiting.

In broadest terms, the heat-transferring device 30 of the present invention comprises a flexible thermally conductive member 38 having a first end and a second end. The first end of the flexible thermally conductive member communicates with the bearing, bearing assembly, and/or heat generating device 10 and the second end communicates with a remote heat sink. Accordingly, at least some of the heat energy being generated by the bearing, bearing assembly, and/or heat generating device 10 is thermally communicated directly or indirectly to the remote heat sink.

Preferably, the heat-transferring device 30 of the present invention includes first and second members 32 and 34 and a flexible member 36 therebetween, all of which are fabricated of a thermally conductive material. More preferably, the thermally conductive material is at least one of copper, aluminum, silver, and carbon, including carbon fiber and carbon-carbon composites.

Preferably, the heat transferring device 30 is configured and arranged to provide minimal axial, transverse, and radial stiffness to the bearing, bearing assembly, and/or heat generating device 10 so as not to affect appreciably the rigid body critical speed of the flywheel rotor. Indeed, preferably, the heat transferring device 30 is configured and arranged so that its radial stiffness is typically in the range of about 10 lb/in to about 1,000 lb/in, and more preferably in the range of about 50 lb/in to about 200 lb/in.

The first thermally conductive member 32 of the preferred embodiment of the heat transferring device 30 is thermally connected or coupled and securely and removably attached to the bearing, bearing assembly, and/or heat generating device 10, e.g., using a first connecting plate 41, such that it is in direct communication with the outer race 12 of the bearing, bearing assembly and/or heat generating device 10. Alternately, in a second embodiment of the heat transferring device 30, the first connecting plate 41 is configured and arranged instead to be in direct communication with an upper bearing cap 47 and/or a lower bearing cap 42, which caps 42 and 47 are in direct communication with the bearing, bearing assembly and/or heat generating device 10.

For example, the first connecting plate 41 can be securely and removably attached to the outer race 12 of the bearing and/or bearing assembly 10 using a plurality of bolts 49a, e.g., standard No. 4 bolts, that can be secured and tightened with an equal plurality of nuts 48a. Indeed, a plurality of slots 35 is provided in the first thermally conductive member 32 to receive a bolt 49a. Such slots 35 in the first thermally conductive member 32 are configured and arranged to align with a similar plurality of slots 25 in the flexible bearing damper 20 described above. Preferably, the bolts 49a are of sufficient length to extend successively through the entire length of a first inner mounting plate 41, the first thermally conductive member 32 of a first heat transferring device 30a, the bearing, bearing assembly, and/or heat generating device 10, a lower bearing cap 42, the first thermally conductive member 32 of a second heat transferring device 30b, and a lower inner mounting plate (not shown). Here again, with respect to the abovementioned second embodiment, the bolts 49a are of sufficient length to extend successively through the entire length of a first inner mounting plate 41, the first thermally conductive member 32 of a first heat transferring device 30a, an upper bearing cap 47, the bearing, bearing assembly, and/or heat generating device 10, a lower bearing cap 42, the first thermally conductive member 32 of a second heat transferring device 30b, and a lower inner mounting plate.

Further, the second thermally conductive member 34 of a preferred embodiment of a heat transferring device 30 is thermally connected or coupled directly or indirectly to a remote heat sink, e.g., to the outer mounting ring 24 of the bearing damper 20, to a mounting plate 45, and the like. As provided in the description above, the heat sink is remote from the locus of the bearing, bearing assembly, and/or heat-generating device 10 to be cooled.

For example, the second thermally conductive member 34 of the heat transferring device 30 can be securely and removably attached to the outer mounting ring 24, mounting plate 45 and the like using a plurality of bolts 49b, e.g., a standard No. 10 bolt, that are secured and tightened with a similar plurality of nuts 48b. Indeed, a plurality of outer holes (not shown) is provided in the second thermally conductive member 34 of the heat transferring device 30 to receive an equal plurality of bolts 49b. Such holes in the second thermally conductive member 34 are configured and arranged to align with a similar plurality of holes 27 in the flexible bearing damper 20 described above. For example, for the embodiment shown in FIG. 4, bolts 49b for the upper heat transferring device 30a extend through the second thermally conductive member 34a of the first heat transferring device 30a into the outer mounting ring 24 of the flexible bearing damper 20, while bolts (not shown) for the lower heat transferring device 30b extend through the second thermally conductive member 34b of the second heat transferring device 30b and the mounting ring 45, terminating in the outer mounting ring 24 of the flexible bearing damper 20.

A flexible thermally conductive member 36 is thermally connected or coupled to the first and second thermally conductive members 32 and 34 such that at least some of the heat energy being generated by the bearing, bearing assembly, and/or heat generating device 10 is thermally communicated directly or indirectly to the remote heat sink sequentially by way of the first, flexible, and second thermally conductive members 32, 36, and 34. Further, the flexible thermally conductive member 36 of the heat transferring device 30 is configured and arranged to enable at least one of relative axial or radial motion, preferably both axial and radial motion, between the first and second thermally conductive members 32 and 34. More particularly, the flexible thermally conductive member 36 is configured and arranged so that the heat transferring device 30 provides minimal radial stiffness to the bearing, bearing assembly, and/or heat generating device 10.

Figure 5:
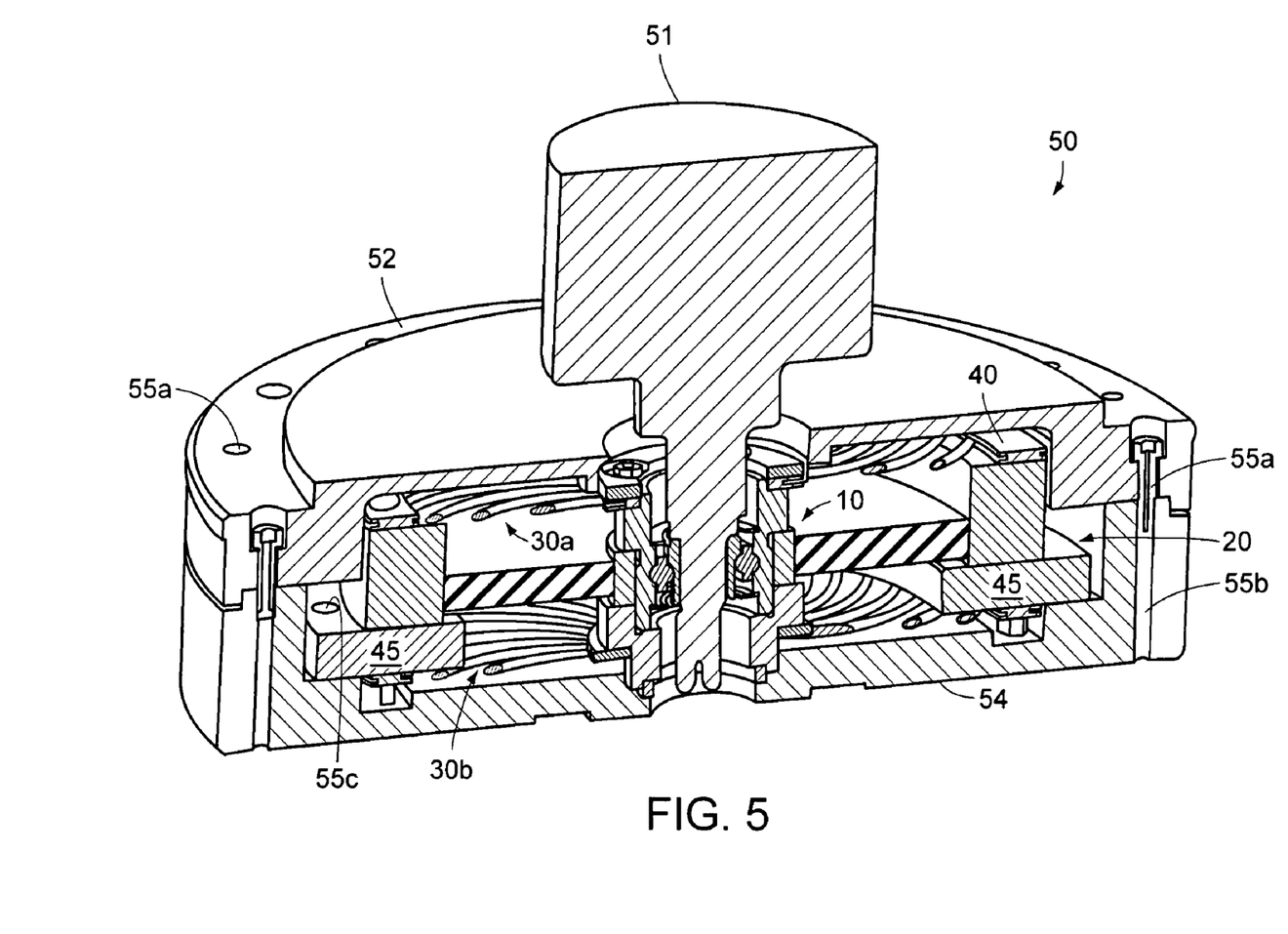
FIG. 5 is an isometric cross-section of a self-contained bearing damping system in accordance with one aspect of the present invention.

In further embodiments of the heat transferring device 30, the first and second thermally conductive members 32 and 34 of the heat transferring device 30 are configured and arranged so that they are disposed with respect to each other in at least one of a radial or an axial direction. In the instance in which the first and second thermally conductive members 32 and 34 are generally radially disposed from each other as shown in FIGS. 4 and 5, one of the first and second thermally conductive members 32 and 34 of the heat transferring device 30 is disposed in a volume that is generally bounded about its circumference by the other thermally conductive member. In a more specific embodiment, the first and second thermally conductive members 32 and 34 of the heat transferring device 30 are arranged so that radials extending between the first and second thermally conductive members 32 and 34 generally lie in the same radial plane. Alternately, in a second embodiment, the first and second thermally conductive members 32 and 34 of the heat transferring device 30 are arranged so that the flexible thermally conductive member 36 extends between the first and second thermally conductive members 32 and 34 so that radials extending from the first and second thermally conductive members 32 and 34 generally lie in the same axial plane.

In a more specific embodiment of the present invention, the flexible thermally conductive member 36 is composed, at least in part, of a thermally conductive material. Further, the flexible thermally conductive member 36 can comprise a plurality of flexible thermally conductive elements 38, each thermally conductive element 38 extending between, and being thermally connected or coupled to each of, the first and second thermally conductive members 32 and 34 of the heat transferring device 30. Preferably, each thermally conductive element 38 comprises one or more, and more preferably a plurality of, strands of flexible multi-strand cable, whereby the plurality of strands is made of a thermally conductive material and is sufficient in number so as to be capable of conducting a desired level of heat energy from the bearing, bearing assembly, and/or heat generating device 10. Moreover, each strand comprising the thermally conductive element 38 comprises a flexible, thermally conductive material, e.g., at least one of copper, aluminum, silver, and carbon, including carbon fiber and carbon-carbon composites, and the like. In a separate embodiment, the flexible thermally conductive member 36 comprises a single, contiguous thermally conductive element (not shown), which is thermally connected or coupled to each of, the first and second thermally conductive members 32 and 34 of the heat transferring device 30.

Preferably, the flexible damping system 40 of the present invention includes at least two heat-transferring devices 30a and 30b in combination with one or more flexible bearing dampers 20. More preferably, at least one heat transferring devices 30a is disposed above the one or more flexible bearing dampers 20 and at least one heat transferring devices 30b is disposed below the one or more flexible bearing dampers 20 as shown in FIG. 4. Those skilled in the art can vary the number and disposition of the heat transferring devices 30 and the flexible bearing dampers 20 to establish the heat transferring and damping properties of the flexible bearing system 40 without violating the scope and spirit of this disclosure.

Yet another aspect of the present invention includes a self-contained bearing damping system 50 for a flywheel-based, evacuated energy storage system. Referring to FIG. 5, there is shown a bearing damping system 50 that includes a plurality of heat transferring devices 30a and 30b in combination with a flexible bearing damper 20. In this illustrative embodiment, which is not intended to be taken or construed as being limited, the self-contained unit 50 comprises all of the elements described above for the flexible bearing damping system 40 in combination with a bearing, bearing assembly, and/or heat generating device 10 and an upper and lower grounding plate 52 and 54. The bearing, bearing assembly, and/or heat generating device 10 is of a type that is well known to the art and, preferably, readily commercially available.

Preferably, the upper and lower grounding plates 52 and 54 are configured and arranged to fit together securely. More preferably, the upper and lower grounding plates 52 and 54 are configured and arranged so that the upper grounding plate 52 can be securely and removably attached to the lower grounding plate 54. For example, FIG. 5 shows one embodied means for securing the grounding plates 52 and 54. Indeed, a plurality of holes 55a in the upper grounding plate 52 are arranged and disposed so that they align with a similar plurality of holes 55b that are arranged and disposed in the lower grounding plate 54. In one aspect of the present invention, a plurality of bolts, screws, and the like (not shown) can be used to securely and removably attach the two grounding plates 52 and 54. Preferably, the lower grounding plate 54 is securely and removably attached to the housing of the flywheel assembly (not shown), e.g., using a plurality of bolts, screws, and the like, or by tight interference fit between the system 50 and the housing of the flywheel assembly.

When attached, the upper and lower grounding plates 52 and 54 enclose the bearing damping system 40 and the bearing, bearing assembly and/or heat generating device 10, which are configured and arranged in a manner described above. The mounting plate 45 of the damping system 40 can be securely and removably attached to the lower grounding plate 54, e.g., using a plurality of bolts, screws, and the like. A plurality of holes 55c is configured and arranged in the mounting plate 45, through which an equal plurality of bolts, screws, and the like (not shown) can be inserted to securely and removably attach the mounting plate 45 to the lower grounding plate 54, which includes a plurality of corresponding holes (not shown) that is arranged and disposed so that the holes align with the plurality of holes 55c in the mounting plate 45.

In one aspect of the present invention, a clearance of varying magnitude separates the upper and lower grounding plates 52 and 54 from the damping system 40 to allow some minor relative displacement between the stator assembly and rotor assembly of the flywheel assembly except where the mounting plate 45 of the bearing damping system 40 is securely and removably attached to the lower grounding plate 54. To maximize the effectiveness and efficiency of a drag pump (not shown), which creates a vacuum by pumping gases to a pressure of about $10^{-5}$ Torr, such clearance is kept to a minimum, e.g., about 0.015 inches (15 mils) with a tolerance of +/−2 mils.

According to another aspect of the present invention, a method of the present invention includes the steps of providing flexible bearing damping; thermally interconnecting a first thermally conductive member of a heat-transferring device to a heat generating device; thermally interconnecting a second thermally conductive member of a heat-transferring device to a remote heat sink; and thermally interconnecting the first and second thermally conductive members with a flexible thermally conductive member such that at least some of the heat energy being generated by the heat generating device is thermally communicated directly or indirectly to the remote heat sink.

Such a method also includes configuring the flexible thermally conductive member so as to allow relative axial and radial motion between the first and second thermally conductive members. This configuring also can include configuring the flexible thermally conductive member such that it has nominal stiffness in each of the axial and radial directions.

In further specific embodiments, the flexible thermally conductive member is composed at least in part of a thermally conductive material and further can be comprised of a plurality of flexible thermally conductive elements, each conductive element extending between, and being thermally connected or coupled to each of, the first and second thermally conductive members. Each conductive element can comprise a flexible, multi-strand cable or a strand thereof, where a plurality or more of the strands are made of a thermally conductive material, sufficient in number so as to be capable of conducting a desired level of heat energy from the heat generating device to the remote heat sink. In a more specific embodiment, each strand is comprised of a thermally conductive material. More specifically, the thermally conductive material is at least one of copper, aluminum, silver and carbon, including carbon fiber and carbon-carbon composites, and the like.

While a number of embodiments of the invention has been described, it should be obvious to those of ordinary skill in the art that other embodiments to and/or modifications, combinations, and substitutions of the present invention are possible, all of which are within the scope and spirit of the disclosed invention.

What is claimed is:

1. A system for damping vibrations and removing heat from a heat generating device, the system comprising:
   two or more flexible dampers, each having a stiffness, wherein said two or more flexible dampers comprises a material selected from the group consisting of elastomers, silicon rubber and a mesh material; and
   two or more heat transferring devices, each having a stiffness, for thermally conducting heat energy produced by said heat generating device to a remote heat sink, wherein said flexible dampers and said heat transferring devices extend in first and second planes in a radial direction, respectively, wherein said first and second planes are substantially parallel, and wherein said stiffnesses of said two or more flexible dampers are significantly greater than said stiffnesses of said two or more heat transferring devices, and wherein at least one of said two or more heat-generating devices further supports a vibration-producing rotating device, having a rigid body critical speed.

2. The system as recited in claim 1, wherein the rotating device is a flywheel rotor shaft of an evacuated energy storage system.

3. The system as recited in claim 1, wherein said stiffnesses of the one or more flexible dampers minimizes the rigid body critical speed of the rotating device.

4. The system as recited in claim 1, wherein the heat-generating device consists of at least one of a bearing and a bearing assembly.

5. The system as recited in claim 1, wherein said stiffnesses of the one or more flexible dampers are between about 500 pounds per inch and about 4000 pounds per inch.

6. The system as recited in claim 5, wherein said stiffnesses of the one or more flexible dampers are a radial stiffness of about 1200 pounds per inch.

7. The system as recited in claim 5, wherein said one or more flexible dampers comprises a core element secured to a circumferential outer mounting ring and a circumferential inner support ring.

8. The system as recited in claim 7, wherein the core element is secured to said outer mounting ring and said inner supporting ring by one of the following: molding, fixedly attaching, air tight interference fit.

9. The system as recited in claim 1, wherein said one or more flexible dampers comprises an elastomeric bearing damper.

10. The system as recited in claim 9, wherein said elastomeric bearing damper comprises a silicon rubber bearing damper.

11. The system as recited in claim 1, wherein said one or more flexible dampers comprises a mesh bearing damper.

12. The system as recited in claim 1, wherein said stiffnesses of the one or more heat transferring devices are a radial stiffness between about 10 pounds per inch and about 1000 pounds per inch.

13. The system as recited in claims 12, wherein said stiffnesses of the one or more heat transferring devices are a radial stiffness between about 50 pounds per inch and about 200 pounds per inch.

14. The system as recited in claim 1, wherein the one or more heat transferring devices comprises a flexible thermally conductive member, having a first end that is thermally coupled to the heat generating device and a second end that is thermally coupled to the remote heat sink.

15. The system as recited in claim 14, wherein the one or more heat transferring devices comprises:
   a first thermally conductive member that is in thermal communication with the heat generating device; and
   a second thermally conductive member that is in thermal communication with the remote heat sink, wherein said flexible thermally conductive member is in thermal communication with said first and second thermally conductive members so that heat can be transferred from said first thermally conductive member to said second thermally conductive member.

16. The system as recited in claim 15, wherein the flexible thermally conductive member comprises one or more strands of a flexible multi-strand cable, wherein said one or more strands of said flexible multi-strand cable is fabricated from a thermally conductive material.

17. The system as recited in claim 16, wherein the flexible multi-strand cable is fabricated from at least one of copper, aluminum, silver, and carbon, including carbon fiber and carbon-carbon composites.

18. The system as recited in claim 15, wherein the flexible thermally conductive member comprises a single element.

19. The system as recited in claim 1, wherein the remote heat sink is at least one of radially and axially disposed from the heat-generating device.

20. The system as recited in claim 1, wherein the heat-transferring device is configured and arranged so that at least some of the heat energy generated by the heat generating device is communicated to the remote heat sink.

21. The system as recited in claim 1, wherein the one or more heat transferring devices is configured and arranged to enable at least one of relative displacement and motion between the heat generating device and the remote heat sink.

22. The system as recited in claim 21, wherein the system for damping vibrations further comprises an upper and lower grounding plates, wherein the clearance between said upper and lower grounding plates is approximately 0.015 inches.

* * * * *